March 12, 1968   J. S. HATTON   3,372,765
APPARATUS FOR WEIGHING VEHICLES IN MOTION
Filed Nov. 9, 1965   2 Sheets-Sheet 1

March 12, 1968   J. S. HATTON   3,372,765
APPARATUS FOR WEIGHING VEHICLES IN MOTION
Filed Nov. 9, 1965   2 Sheets-Sheet 2

INVENTOR
JOHN SAMUEL HATTON
By: Norris + Bateman
Attys

United States Patent Office 3,372,765
Patented Mar. 12, 1968

3,372,765
APPARATUS FOR WEIGHING VEHICLES
IN MOTION
John Samuel Hatton, 28 Ebrington, West Bromwich,
Staffordshire, England
Filed Nov. 9, 1965, Ser. No. 507,017
Claims priority, application Great Britain, Nov. 21, 1964,
47,486/64
8 Claims. (Cl. 177—211)

ABSTRACT OF THE DISCLOSURE

Apparatus for weighing vehicles in motion comprises an electrical transducer responsive to dynamic weight of a vehicle, and preferably including at least one strain gauge bridge responsive to weight imposed on a railtrack section, an inductance-capacitance filter connected to the output of the transducer, circuit means responsive to the peak value of the output of the transducer to effect rapid charging of a capacitance element of the filter circuit to a voltage proportional to the peak value, and switching means operative both to connect said circuit means between the transducer output and the filter circuit to receive the peak value of the transducer output, and to break this connection substantially immediately following receipt of the peak value. The switching means is preferably a switch actuated by the moving vehicle and it further comprises a single pulse generator controlled by the switch to give a pulse whose commencement and cessation respectively initiate and terminate rapid charging of the condenser from said circuit means. The circuit means preferably includes a variable attenuator to provide adjustment of the proportionality of the rapid charging voltage to the peak response. A time delay circuit is operative to switch the capacitance from the transducer output to a voltage responsive indicator and/or recorder.

---

This invention relates to apparatus for weighing vehicles in motion.

When weighing moving vehicles, such as rail rolling stock, the weight must be sensed and indicated and/or recorded as quickly as possible so that the vehicles can run over the weighing system at a reasonable speed. Therefore mechanically stiff weighing systems employing electrical weight transducers are often used. During each weighing cycle, oscillations are present in the electrical transducer output due to resonant vibrations both in the weighing system and in the vehicle suspension. Oscillations are also created by such further factors as vehicle wheel eccentricity, irregularity of the wheel surface and unevenness of the rail track. In practice the aforesaid vibrations in the weighing system are generally of a comparatively high frequency whilst the vibrations due to the vehicle and track are usually of low frequency.

Whilst a low-pass filter can be used to filter out oscillations in the transducer output signal, (and also more completely to filter out the high frequency components), the values required in a resistance/capacitance or inductance/capacitance filter to attenuate sufficiently the low frequency oscillatory components have too great a time constant to allow the output to follow a step input such as that resulting from the sudden arrival of the load on the weighing system. The present invention has for its object to overcome this difficulty and so increase the accuracy and/or speed of weight indication and/or recording.

The invention comprises novel apparatus for weighing a vehicle in motion comprising associated means for sensing the peak electrical response of a transducer to dynamic weight of the vehicle, automatically forming from the peak response an estimate of static weight of the vehicle, and automatically and rapidly charging a capacitance of a voltage approximately representing the estimated weight before allowing the capacitance to respond to variations in the transducer response subsequent to its peak response.

The invention further consists of apparatus for weighing vehicles in motion comprising an electrical transducer responsive to dynamic weight of a vehicle, an impedance/capacitance filter connected to the output of the transducer, and circuit means responsive to the peak value of the output of the transducer to effect rapid changing of a capacitance element of the filter circuit to a voltage proportional to the peak value.

Preferably according to the invention the peak responsive circuit is switched into operative connection with the filter capacitance to charge the latter upon operation of the switch by a vehicle passing onto the track section.

One example of the practical realisation of the invention is described with reference to the accompanying drawings, wherein.

Figure 1:
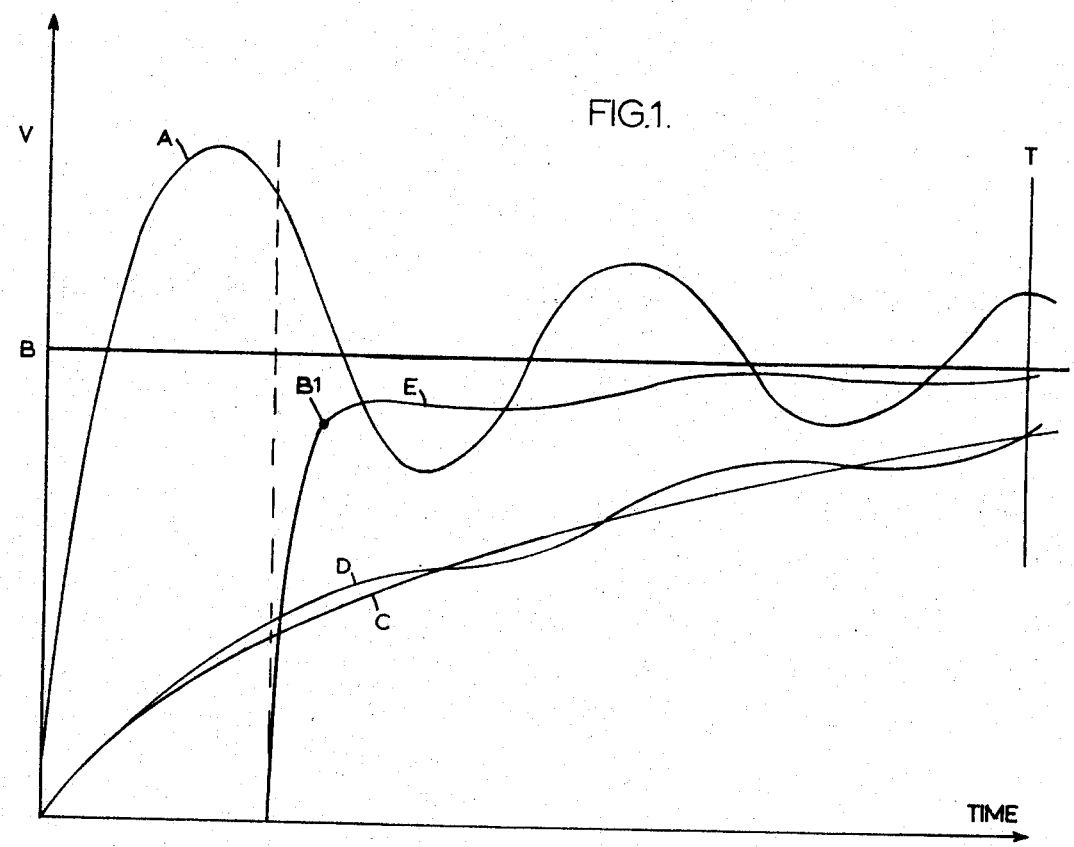
FIGURE 1 shows typical transducer output wave forms as hereinafter described.
Figure 2:
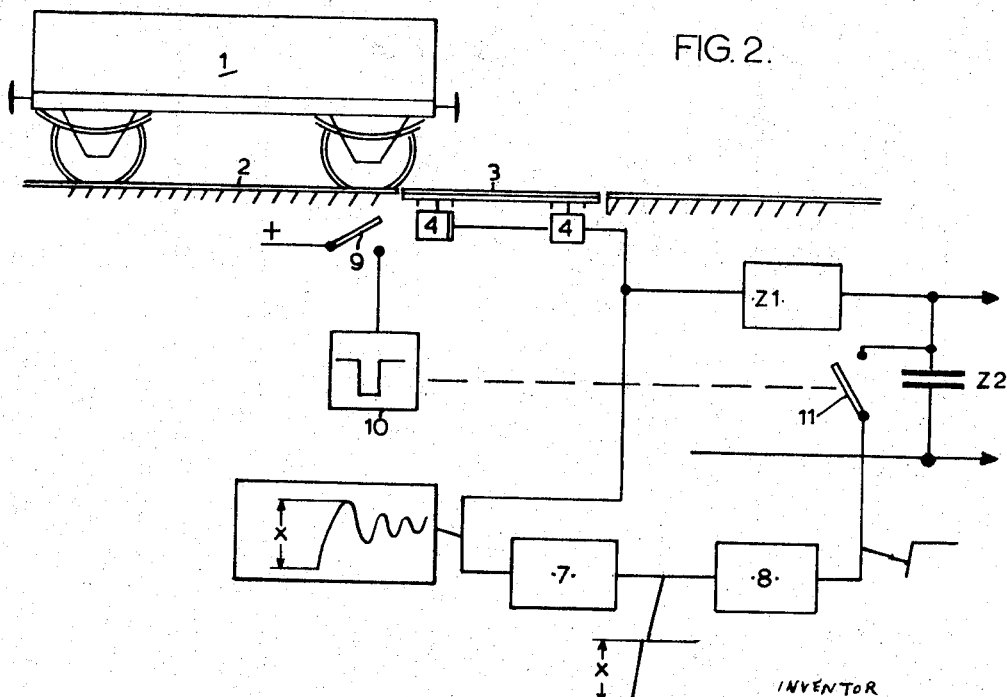
FIGURE 2 is a schematic circuit diagram of a weighing system according to the invention.

Referring to FIGURES 1 and 2, curve A shows a typical output wave form transducer load cells 4 carrying the independently mounted track section 3 interposed in the track 2 for the rolling stock 1. For the sake of simplicity curve A shows only the low frequency component of the output voltage. B is a level representing the weight imposed on the load cells 4. Curve C is the response of a conventional electrical filter circuit to a step input of amplitude B. Curve D shows the approximate response to an input of the wave form A. If the end of the allowable time for indication and/or recording the weight on track section 3 occurs at point T then the error in the measured weight using a conventional filter is represented by the difference in levels between curve D and level B at time T. The following method and means are used to reduce this error by minimising the effect of the initial rise in the input wave form A.

The method may be summarized as measurement of the initial peak value of curve A, and forming from this measurement an estimate of the approximate value for B. A capacitive element of the filter circuit is then charged approximately to this value during a short period immediately following the peak as shown in curve E.

The capacitive element is charged from a low impedance source and hence reaches level B' in a short time period. The filter response (or time constant) now has only to follow the step B' to B from the subsequent reduced amplitude fluctuations of wave form A about the level B. The curve E shows how the resultant filter output is able to approach more closely to level B at time T than is the case with conventional filter circuits.

The ratio of the peak value of curve A to level B depends on several factors, including more particularly the rate of application of load to the track section, the evenness of the track at the junctions betwen the parts 2 and 3, and the various damping factors of the system. In a given installation the ratio can usually be expected to remain fairly constant and a typical ratio would be about 2.

FIGURE 2 is a schematic circuit diagram showing the means for reducing the effect of the transients in the filter by pre-charging the filter capacitor to a voltage approximately representing the weight. In this circuit the electrical output from the load cells 4 is fed both into a filter circuit comprising impedances Z1 and capacitor Z2, and into a peak detecting and storage circuit 7 and attenuator 8. A switch circuit 9 is actuated by passage of the leading axle of a vehicle onto the track section 3. The switch 9 connects a generator 10 of single pulses so that a pulse output closes a switching circuit 11 for a pre-set time period. While switch 11 is closed, the capacitor Z2 is charged through the relatively short time constant circuit 7, 8 to a voltage B' approximately to that representing the weight exerted by the load on the axle. At time T, shortly before the axle reaches the end of the track section 3, the voltage on the capacitor Z2 has changed to a value closer to the correct weight due to the integrating action of the filter on the load cells output voltage. The voltage on capacitor Z2 at time T is measured and used to operate indicating and/or recording devices in known manner to represent weight carried by the axle which is passing over the track section 3.

Figure 3:
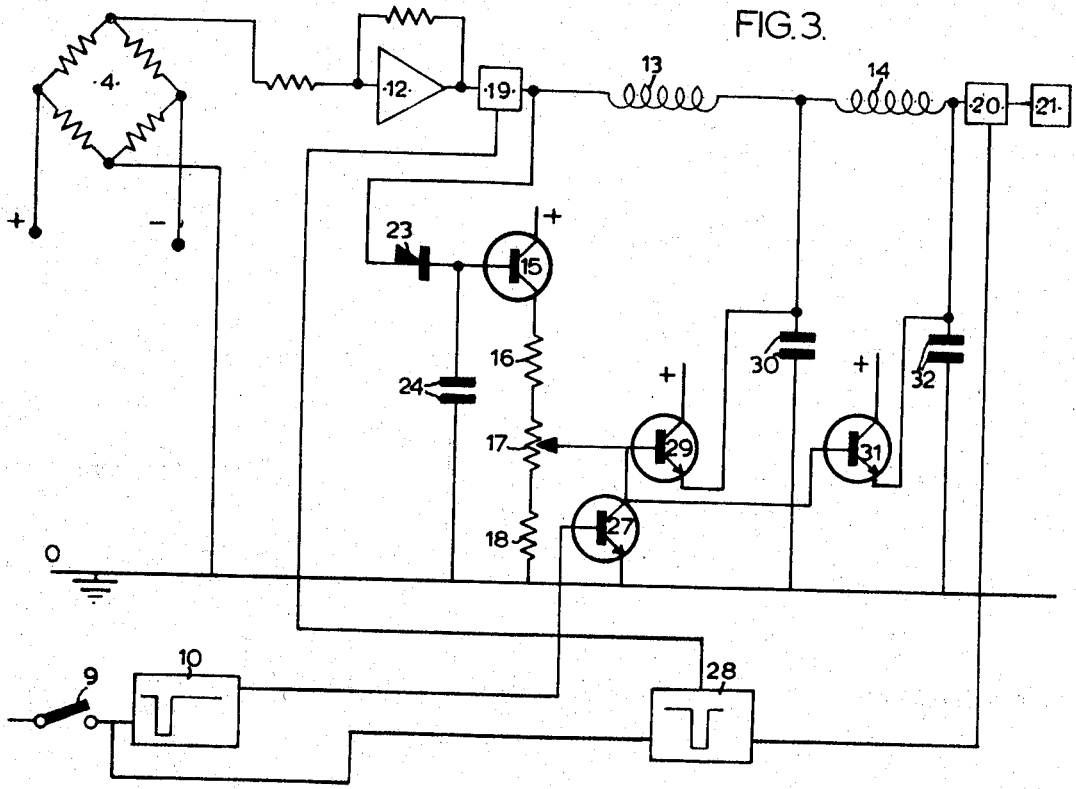
FIGURE 3 is a circuit diagram showing parts of the system of FIGURE 2 in greater detail.

In the practical example shown in FIGURE 3, the strain gauge bridge type load cell 4 is fed with a D.C. voltage and the ouput is amplified by a stable D.C. amplifier 12. The amplifier output is filtered by inductance 13 and capacitor 30 equivalent to impedance Z1 and capacitance Z2 of FIGURE 2. The peak output voltage is also stored in capacitor 24 charged via diode 23. The emitter follower transistor 15 presents a high impedance to capacitor 24 to prevent rapid discharge of the latter. The output voltage at the emitter of 15 is attentuated via resistors 16, 17 and 18 as required by the ratio of peak transient voltage to mean D.C. output voltage, as determined by calculation or preferably by test under operating conditions. The attenuated voltage is fed via emitter follower 29 to capacitor 30 which is charged rapidly via the low output impedance at the emitter of the transistor.

The sequence of operations is as follows:

Closure of the vehicle operated switch circuit 9 initiates a negative pulse from the monostable pulse generator 10. This negative pulse applied to the base of transistor 27 "cuts off" the transistor, presenting a high impedance at its collector. The remainder of the circuit functions during this period as described above, so charging capacitor 30 to approximately the required voltage. At the end of the negative pulse, transistor 27 conducts, bringing the base of transistor 29 to nearly zero or earth potential as on the lower plate of capacitor 30. The base emitter diode of transistor 29 is now reversed biased and the filter operates normally to approach the true means potential required on capacitor 30. A further time delay circuit 28 may be used to control the registration of the weight by generating a pulse just before the moving weight leaves the weighing platform. The pulse may be used to open gate 19 and close gate 20, disconnecting the filter from the amplifier and connecting the output to a suitable high speed indicating or printing unit denoted by 21.

It will be realised that several filter stages may be controlled simultaneously as shown by transistor 31, inductance 14 and capacitor 32.

I claim:
1. Apparatus for weighing vehicles in motion comprising an electrical transducer responsive to dynamic weight of a vehicle, an inductance-capacitance filter connected to the output of the transducer, and circuit means responsive to the peak value of the output of the transducer to effect rapid charging of a capacitance element of the filter circuit to a voltage proportional to the peak value.

2. Apparatus according to claim 1, wherein said circuit means includes a variable attenuator to provide adjustment of the proportionality of the rapid charging voltage to the peak response.

3. Apparatus according to claim 1, wherein the transducer comprises at least one strain gauge bridge responsive to weight imposed on a rail track section.

4. Apparatus according to claim 1, comprising an indicator and/or recorder responsive to the voltage attained by the capacitance.

5. Apparatus according to claim 1, comprising switching means operative both to connect said circuit means between the transducer output and the filter circuit to receive the peak value of the transducer output, and to break this connection substantially immediately following receipt of the peak value.

6. Apparatus according to claim 5, wherein the switching means comprises a switch actuated by the moving vehicle.

7. Apparatus according to claim 6, wherein the switching means further comprises a single pulse generator controlled by the switch to give a pulse whose commencement and cessation respectively initiate and terminate rapid charging of the condenser from said circiut means.

8. Apparatus according to claim 4, comprising a time delay circuit operative to switch the capacitance from the transducer output to the indicator and/or recorder.

References Cited
UNITED STATES PATENTS

| | | | |
|---|---|---|---|
| 2,764,399 | 9/1956 | Porter | 177—211 X |
| 3,063,635 | 11/1962 | Gordon | 177—163 |
| 3,101,800 | 8/1963 | Raskin. | |
| 3,192,535 | 6/1965 | Watson | 177—211 X |
| 3,276,525 | 10/1966 | Cass | 177—163 X |
| 3,288,231 | 11/1966 | Hanne | 177—210 |

RICHARD B. WILKINSON, *Primary Examiner.*

G. H. MILLER, JR., *Assistant Examiner.*